(12) United States Patent
Thapliyal et al.

(10) Patent No.: US 8,963,991 B2
(45) Date of Patent: Feb. 24, 2015

(54) SYSTEMS AND METHODS FOR CAUSING A USER TO LOOK INTO A CAMERA

(71) Applicant: Citrix Systems, Inc., Fort Lauderdale, FL (US)

(72) Inventors: Ashish Thapliyal, Santa Barbara, CA (US); Matthew Anderson, Arvada, CO (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 10 days.

(21) Appl. No.: 13/729,745

(22) Filed: Dec. 28, 2012

(65) Prior Publication Data

US 2014/0184736 A1    Jul. 3, 2014

(51) Int. Cl.
*H04N 7/14*    (2006.01)

(52) U.S. Cl.
CPC .................................... *H04N 7/144* (2013.01)
USPC ................... 348/14.16; 348/14.08; 348/14.12

(58) Field of Classification Search
CPC ......... H04N 7/14; H04N 7/141; H04N 7/142; H04N 7/144; H04N 7/147; H04N 7/148; H04N 7/15
USPC .............................................. 348/14.01–14.16
See application file for complete search history.

(56) References Cited

U.S. PATENT DOCUMENTS

| | | | |
|---|---|---|---|
| 5,430,473 A * | 7/1995 | Beecher et al. ............ | 348/14.05 |
| 6,373,516 B1 * | 4/2002 | Kim ............................ | 348/14.01 |
| 8,711,201 B2 * | 4/2014 | Gorzynski ................. | 348/14.07 |
| 2001/0011951 A1 * | 8/2001 | Kimata et al. ............. | 340/815.4 |

* cited by examiner

*Primary Examiner* — Melur Ramakrishnaiah
(74) *Attorney, Agent, or Firm* — BainwoodHuang

(57) ABSTRACT

Systems and method for causing a user to look into a camera are described. In some aspects, a position of a camera coupled with a computing device is determined. A computer-generated element is displayed proximate to the determined position of the camera. The computer-generated element is presented for causing a user of the computing device to reposition a face of the user toward the determined position of the camera.

20 Claims, 4 Drawing Sheets

SYSTEMS AND METHODS FOR CAUSING A USER TO LOOK INTO A CAMERA

FIELD OF THE INVENTION

The subject technology relates generally to communication technology. More specifically, the subject technology relates to causing a user to look into a camera.

BACKGROUND OF THE INVENTION

Oftentimes, people communicate using video conferencing technology. Video conferencing allows participants to see and hear one another and creates a feeling of togetherness of the participants. However, in some cases, participants in video conferences may need to look at their computer screens, away from their cameras, to see visual data being shared during the video conference. A participant looking or turning his/her face away from his/her camera in a video conference creates an awkward feeling, similar to a participant in conversation looking away from the other participants or into his/her computer.

SUMMARY OF THE INVENTION

In some aspects, a computer-implemented method for causing a user to look into a camera is provided. The method includes determining a position of a camera coupled with a computing device. The method includes displaying a computer-generated element proximate to the determined position of the camera, the computer-generated element being presented for causing a user of the computing device to reposition a face of the user toward the determined position of the camera.

In some aspects, a non-transitory computer-readable medium for causing a user to look into a camera is provided. The computer-readable medium includes instructions. The instructions include code for receiving a set of queries. The instructions include code for determining a position of a camera coupled with a computing device. The instructions include code for displaying a computer-generated element proximate to the determined position of the camera, the computer-generated element being presented for causing a user of the computing device to reposition a face of the user toward the determined position of the camera.

In some aspects, a system for causing a user to look into a camera is provided. The system includes processing hardware and a memory. The memory includes instructions. The instructions include code for receiving a set of queries. The instructions include code for determining a position of a camera coupled with a computing device. The instructions include code for displaying a computer-generated element proximate to the determined position of the camera, the computer-generated element being presented for causing a user of the computing device to reposition a face of the user toward the determined position of the camera.

BRIEF DESCRIPTION OF THE DRAWINGS

The foregoing discussion will be understood more readily from the following detailed description of the invention, when taken in conjunction with the accompanying drawings, in which.

DETAILED DESCRIPTION

As set forth above, in some cases, participants in video conferences may look or turn their faces away from their cameras to focus on their computer screens or interesting visual stimuli in their surroundings. A participant looking or turning his/her face away from his/her camera in a video conference creates an awkward feeling, similar to a participant in conversation looking away from the other participants. As the foregoing illustrates, a new approach for causing a participant in a video conference to look or turn his/her face toward his/her camera may be desirable.

The subject technology provides techniques for causing a user to look into or turn his/her face toward a camera. According to some aspects, a computing device that is running an application for transmitting video captured via a camera (e.g., a video conferencing application) determines a position of the camera coupled with the computing device. For example, if the make and model of the computing device is known, the position of a built-in camera can be determined based on the make and model. The computing device displays a computer-generated element on the screen proximate to the determined position of the camera. For example, in a video conferencing application, the computer-generated element can be a video from the video conference. The computer-generated element is presented for causing a user of the computing device to reposition his/her face toward the determined position of the camera.

Advantageously, as a result of some implementations, the subject technology causes users of video conferencing (or other) application(s) to look into their cameras. As a result, the users will appear to be facing one another rather than looking away from one another, creating a feeling of togetherness and community among the participants in the video conference.

As used herein, the term "proximate" encompasses its plain and ordinary meaning including, but not limited to on a line of view between a user's eye(s) and the camera, within a threshold angle (e.g., 15 degrees or 30 degrees) of the line of view with an vertex of the angle being the user's eye(s) or the camera, or within a threshold distance (e.g., 5 centimeters or 10 centimeters) of the line of view. A position of the user's eye(s) can be a position of the left eye, a position of the right eye, or a position of a midpoint between the left eye and the right eye.

Figure 1:
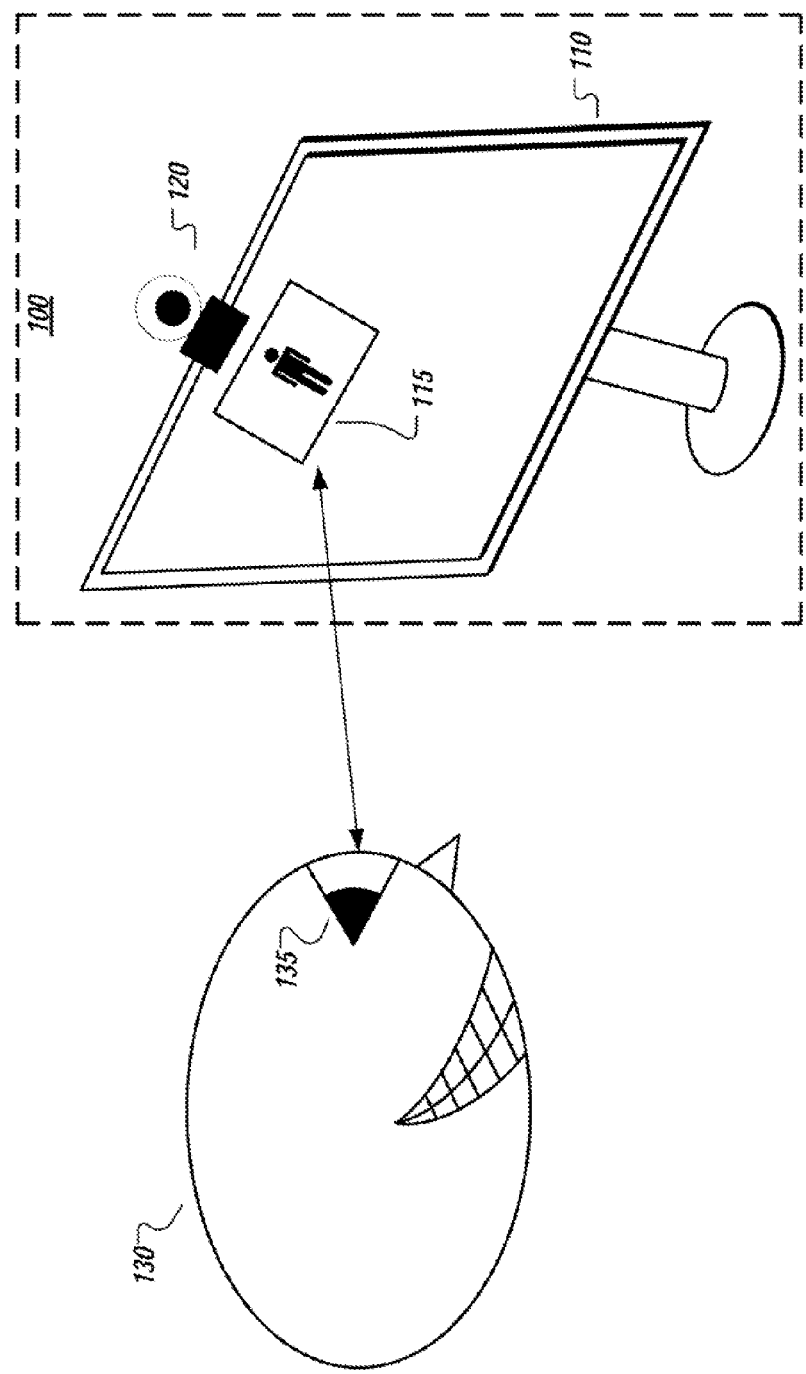
FIG. 1 illustrates an exemplary system for causing a user to look into a camera.

FIG. 1 illustrates an exemplary system 100 for causing a user to look into a camera.

As shown, the system 100 includes a display device 110 and a camera 120. A user 130 is shown interacting with the system 100. The display device 110 and the camera 120 may be components of a computer or coupled with the computer. The display device 110 can include one or more screens or can be any other display device (e.g., a projector). The camera 120 can be a webcam or any other camera configured to generate images that may be transmitted to a remote computing device or stored in a local memory. The camera 120 is illustrated as being external to the display device 110. However, in some implementations, the camera 120 may be embedded within the display device 110.

As illustrated, the screen 110 illustrates a computer-generated element 115 proximate to the position of the camera 120. The computer-generated element 115 may be generated by the computer associated with the display device 110 and the camera 120 or by another computer. In some aspects, the computer is running an application for transmitting video captured via the camera, for example, an online meeting application. The computer-generated element can include any visual data or content related to the online meeting application. For example, the computer-generated element 115 can be a video feed or a screen sharing feed from the online meeting application. Alternatively, the computer-generated element can include data from one or more files being shared via the online meeting application. In some aspects, the computer-generated element 115 includes a flashing light or text. The flashing light or text is configured to be attractive to the user 130 but not distracting to the user 130. In some aspects, the text includes text from a prewritten speech that the user 130 is reading in the online meeting.

As shown in FIG. 1, the user 130 is looking, with his/her eyes 135, at the computer-generated element 115. Thus, the eyes 135 of the user 130 are directed to the computer-generated element 115. The computer-generated element 115 is positioned proximate to the position of the camera 120. Thus, the user 130 appears, to a recipient of data from the camera 120, to be looking into the camera 120 and to have his/her face and his/her eyes 135 directed toward the camera 120. As a result, a better image of the user 130 is captured by the camera 120. In an online meeting or video conference setting, the user 130 appears more engaged in the meeting or conference, more sociable, and more attentive to the other participant(s).

Figure 2:
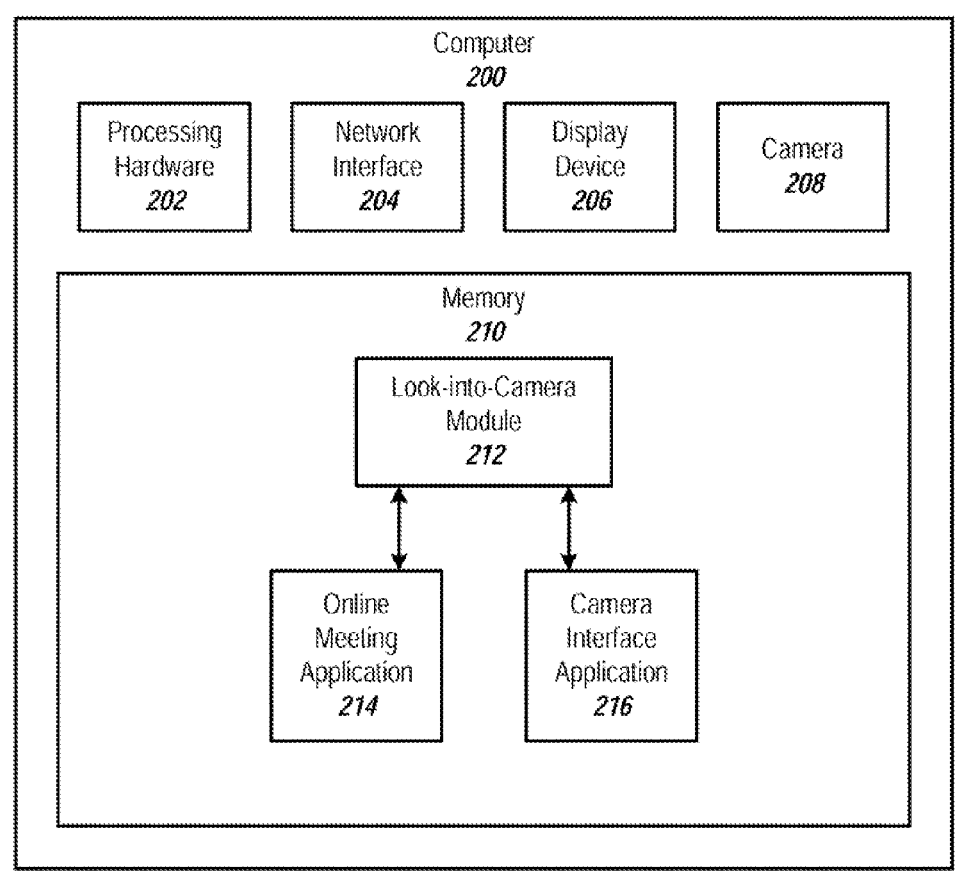
FIG. 2 illustrates an exemplary computer for causing a user to look into a camera.

FIG. 2 illustrates an exemplary computer 200 for causing a user to look into a camera.

FIG. 2 illustrates a single computer 200. However, according to some aspects, the components of the computer 200 of FIG. 2 may be implemented on multiple computers. Each of the multiple computers can include a portion of the components of the computer 200. The computer 200 can include one or more of a laptop computer, a desktop computer, a mobile phone, a personal digital assistant (PDA), a tablet computer, a netbook, a television with one or more processors embedded therein or coupled thereto, a physical machine, or a virtual machine.

As shown, the computer 200 includes processing hardware 202, a network interface 204, a display device 206, a camera 208, and a memory 210. The processing hardware 202 includes one or more processors. The processing hardware 202 is configured to execute computer instructions that are stored in a computer-readable medium, for example, the memory 210. In some aspects, the processing hardware 202 includes one or more of a central processing unit (CPU) or a graphics processing unit (GPU). The network interface 204 is configured to allow the computer 200 to transmit and receive data in a network, e.g., the Internet, a cellular network, a wired network, or a wireless network. The network interface 204 may include one or more network interface cards (NICs). The display device 206 may include one or more screens. The display device 206 may be internal to the computer 200 or external to the computer 200 and connected with the computer 200 (e.g., via one or more wires or cables). The display device 206 can correspond to the display device 110 of FIG. 1. The camera 208 may include a webcam or any other camera configured to input image(s) to the computer 200 for transmitting to another device or storing locally on the computer 200. The camera 208 may be internal to the computer 200 or external to the computer 200 and connected with the computer 200 (e.g., via one or more wires or cables). The camera 208 can correspond to the camera 120 of FIG. 1. In some implementations, the camera 208 is embedded within the display device 206. In some implementations, the camera 208 is independent of the display device 206.

The memory 210 stores data or instructions. The memory 210 may be one or more of a cache unit, a storage unit, an internal memory unit, or an external memory unit. As illustrated, the memory 210 includes a look-into-camera module 212, an online meeting application 214, and a camera interface application 216. While the look-into-camera 212 module is illustrated as being external to the online meeting application 214 and the camera interface application 216, in some aspects, the look-into-camera module 212 may be implemented as a component of the online meeting application 214 or the camera interface application 216.

The look-into-camera module 212 is configured to cause a user (e.g., user 130) of the computer 200 to look into the camera 208. In some aspects, the look-into-camera module 212 is configured to determine the position of the camera 208 and display, on the display device 206, a computer-generated element (e.g., computer-generated element 115) proximate to the determined position of the camera 208. The computer-generated element is presented for causing the user of the computer 200 to reposition his/her face toward the determined position of the camera 208 so that the user appears to be facing or looking toward the camera 208.

The online meeting application 214 is configured to facilitate participation in an online meeting by the user of the computer 200. The online meeting may include one or more participants other than the user and may include screen sharing or sharing of video feed(s), file(s) from the computing devices of the participants, or external or cloud-based content or files. The online meeting application 214 is coupled with the look-into-camera module 212 to allow the online meeting application 214 to instantiate the look-into-camera module 212 to cause the user to look into the camera 208 during the online meeting.

The camera interface application 216 may be any application that receives data from or interfaces with the camera 208. For example, the camera interface application 216 can be a picture taking application, a video recording application, a video conferencing application, a facial recognition application, etc. The camera interface application 216 is coupled with the look-into-camera module 212 to allow the camera interface application 216 to instantiate the look-into-camera module 212 to cause the user to look into the camera 208 during execution of the camera interface application 216. In some aspects, the online meeting application 214 is an example of a camera interface application 216.

While the subject technology is illustrated in FIG. 2 in conjunction with one online meeting application 214 and one camera interface application 216, the subject technology may be implemented with none, one, or multiple online meeting application(s) or with none, one, or multiple camera interface application(s).

Figure 3:
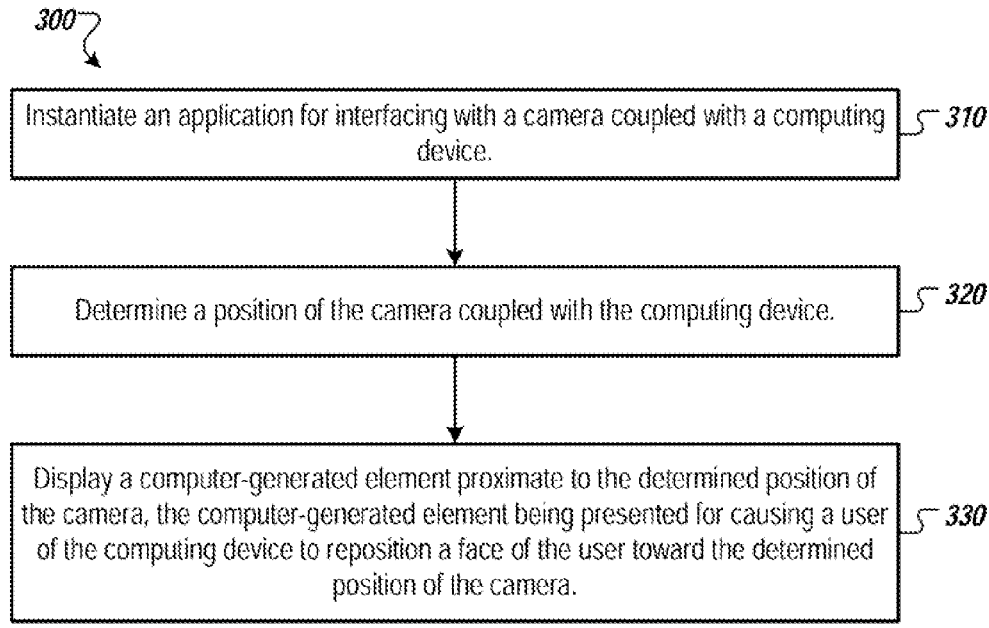
FIG. 3 illustrates an exemplary process for causing a user to look into a camera.

FIG. 3 illustrates an exemplary process 300 for causing a user to look into a camera.

The process 300 begins at step 310, where a computing device (e.g., computer 200) instantiates an application for transmitting video captured via a camera (e.g., camera 208 or camera 120) coupled with the computing device. The camera coupled with the computing device may be internal or external to the computing device. The application can be an online meeting application, a video conferencing application, an application that transmits video captured via the camera, or any other application that interfaces with the camera.

In step 320, the computing device determines a position of the camera coupled with the computing device. In some aspects, the computing device determines a computing device type of the computing device and determines the position of the camera based on a position of a built-in camera of the computing device type. The position of the built-in camera of the computing device type may be determined by looking up the position of the built-in camera of the computing device type in a data repository. The data repository can include a mapping of computing device type(s) to position(s) of built-in camera(s). In some aspects, the computing device receives, from a user of the computing device, an input indicating the position of the camera. For example, the user could touch on a touch screen or click a mouse at a position on the screen proximate to the camera. Some examples of a process for determining the position of the camera are provided herein in conjunction with FIG. 4 and the description of FIG. 4.

In step 330, the computing device displays a computer-generated element (e.g., computer-generated element 115) proximate to the determined position of the camera. The computer-generated element is presented for causing the user (e.g., user 130) of the computing device to reposition his/her face toward the determined position of the camera. If the application instantiated in step 310 is an online meeting application, the computer-generated element can be a video feed or a screen sharing feed from the online meeting application. Alternatively, the computer-generated element can include data from one or more files being shared via the online meeting application, for example, a slide show file. In some aspects, the computer-generated element includes a control for the application. For example, if the application is a photograph-taking application, the computer-generated element can include a button that is to be touched or clicked for a photograph to be taken. In an online meeting application, the control can include buttons for muting the speaker, muting the microphone, or changing a slide that is being displayed in a slide show associated with the online meeting application. After step 330, the process 300 ends.

As set forth above, the steps 310-330 of the process 300 are carried out according to a certain order and in series. However, the steps 310-330 of the process 300 may be carried out in any order. In some aspects, two or more of the steps 310-330 can be carried out in parallel.

Figure 4:
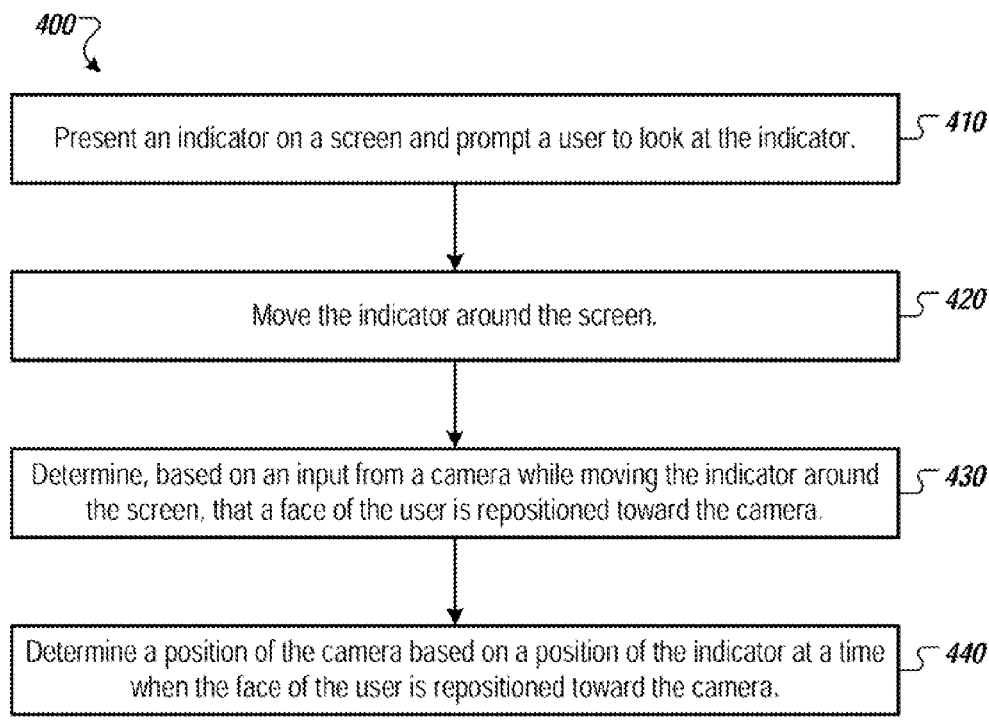
FIG. 4 illustrates an exemplary process for determining a position of a camera.

FIG. 4 illustrates an exemplary process 400 for determining a position of a camera. For example, the process 400 can be carried out in conjunction with step 320 of the process 300 of FIG. 3.

The process 400 begins at step 410, where a computing device (e.g., computer 200) presents an indicator on a screen (e.g., display device 206 or display device 110) and prompts the user to look at the indicator. For example, the indicator could be a circle, a square, or another shape. The indicator can be any color. In some cases, the indicator is colored so as to distinguish the indicator from its background. The background can include the default background or one or more windows. For example, if the computing device is displaying a blue background and a white and black word processing window, the indicator may be red.

In step 420, the computing device moves the indicator around the screen. If the camera (e.g., camera 208 or camera 120) is definitely not embedded in the screen, the indicator may move around the border or edge of the screen. If the camera may be embedded in the screen, the indicator may move around both the border or edge and the interior or middle part of the screen.

In step 430, the computing device determines, based on an input from a camera while moving the indicator around the screen, that a face of the user is repositioned toward the camera (e.g., that the user is looking at the camera).

In step 440, the computing device determines a position of the camera based on a position of the indicator at the time when the face of the user is repositioned toward the camera. At the time that the user is looking at the indicator and at the camera, the camera may be on or proximate to the line of sight from the position of the user's eye(s) to the indicator. If the camera is embedded in the screen or placed adjacent to the screen, the camera may be positioned proximate to the indicator. After step 440, the process 400 ends.

The process 400 is described in conjunction with a screen. However, in some examples, a display device other than a screen, for example, a projector, may be used in place of the screen. In some examples, the screen described in conjunction with the process 400 may include multiple screens. The multiple screens may be of the same size or two or more screens may have different sizes.

As set forth above, the steps 410-440 of the process 400 are carried out according to a certain order and in series. However, the steps 410-440 of the process 400 may be carried out in any order. In some aspects, two or more of the steps 410-440 can be carried out in parallel.

Figure 5:
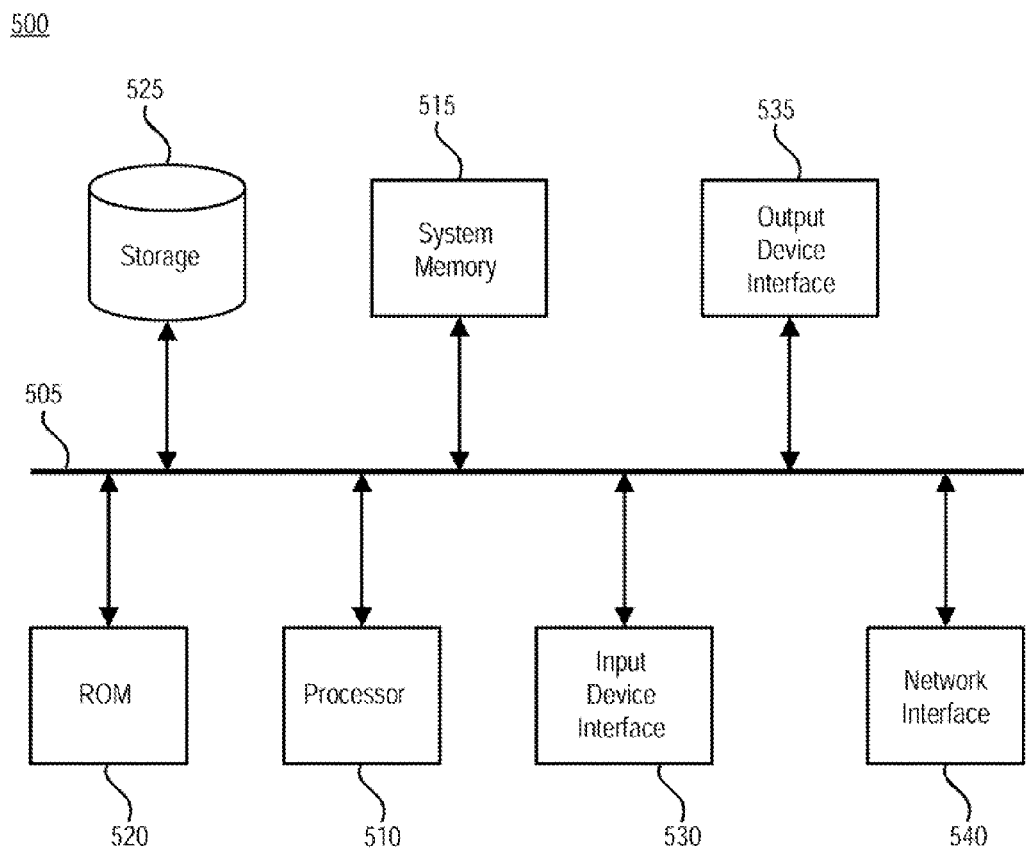
FIG. 5 conceptually illustrates an exemplary electronic system with which some implementations of the subject technology are implemented.

FIG. 5 conceptually illustrates an electronic system 500 with which some implementations of the subject technology are implemented. For example, the computer 200 may be implemented using the arrangement of the electronic system 500. The electronic system 500 can be a computer (e.g., a mobile phone, PDA), or any other sort of electronic device. Such an electronic system includes various types of computer readable media and interfaces for various other types of computer readable media. Electronic system 500 includes a bus 505, processing unit(s) 510, a system memory 515, a read-only memory 520, a permanent storage device 525, an input device interface 530, an output device interface 535, and a network interface 540.

The bus 505 collectively represents all system, peripheral, and chipset buses that communicatively connect the numerous internal devices of the electronic system 500. For instance, the bus 505 communicatively connects the processing unit(s) 510 with the read-only memory 520, the system memory 515, and the permanent storage device 525.

From these various memory units, the processing unit(s) 510 retrieves instructions to execute and data to process in order to execute the processes of the subject technology. The processing unit(s) can be a single processor or a multi-core processor in different implementations.

The read-only-memory (ROM) 520 stores static data and instructions that are needed by the processing unit(s) 510 and other modules of the electronic system. The permanent storage device 525, on the other hand, is a read-and-write memory device. This device is a non-volatile memory unit that stores instructions and data even when the electronic system 500 is off. Some implementations of the subject technology use a mass-storage device (for example a magnetic or optical disk and its corresponding disk drive) as the permanent storage device 525.

Other implementations use a removable storage device (for example a floppy disk, flash drive, and its corresponding disk drive) as the permanent storage device 525. Like the permanent storage device 525, the system memory 515 is a read-and-write memory device. However, unlike storage device 525, the system memory 515 is a volatile read-and-write memory, such a random access memory. The system memory 515 stores some of the instructions and data that the processor needs at runtime. In some implementations, the processes of the subject technology are stored in the system memory 515, the permanent storage device 525, or the read-only memory 520. For example, the various memory units include instructions for causing a user to look into a camera in accordance with some implementations. From these various memory units, the processing unit(s) 510 retrieves instructions to execute and data to process in order to execute the processes of some implementations.

The bus 505 also connects to the input and output device interfaces 530 and 535. The input device interface 530 enables the user to communicate information and select commands to the electronic system. Input devices used with input device interface 530 include, for example, alphanumeric keyboards and pointing devices (also called "cursor control devices"). Output device interfaces 535 enables, for example, the display of images generated by the electronic system 500. Output devices used with output device interface 535 include, for example, printers and display devices, for example cathode ray tubes (CRT) or liquid crystal displays (LCD). Some implementations include devices for example a touch screen that functions as both input and output devices.

Finally, as shown in FIG. 5, bus 505 also couples electronic system 500 to a network (not shown) through a network interface 540. In this manner, the electronic system 500 can be a part of a network of computers (for example a local area network ("LAN"), a wide area network ("WAN"), or an Intranet, or a network of networks, for example the Internet. Any or all components of electronic system 500 can be used in conjunction with the subject technology.

The above-described features and applications can be implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage or flash storage, for example, a solid-state drive, which can be read into memory for processing by a processor. Also, in some implementations, multiple software technologies can be implemented as sub-parts of a larger program while remaining distinct software technologies. In some implementations, multiple software technologies can also be implemented as separate programs. Finally, any combination of separate programs that together implement a software technology described here is within the scope of the subject technology. In some implementations, the software programs, when installed to operate on one or more electronic systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, for example microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, for example is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, for example application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

The subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects of the disclosed subject matter, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components illustrated above should not be understood as requiring such separation, and it should be understood that the described program components and systems can generally be integrated together in a single software product or packaged into multiple software products.

Various modifications to these aspects will be readily apparent, and the generic principles defined herein may be applied to other aspects. Thus, the claims are not intended to be limited to the aspects shown herein, but is to be accorded the full scope consistent with the language claims, where reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase, for example, an "aspect" does not imply that the aspect is essential to the subject technology or that the aspect applies to all configurations of the subject technology. A disclosure relating to an aspect may apply to all configurations, or one or more configurations. A phrase, for example, an aspect may refer to one or more aspects and vice versa. A phrase, for example, a "configuration" does not imply that such configuration is essential to the subject technology or that such configuration applies to all configurations of the subject technology. A disclosure relating to a configuration may apply to all configurations, or one or more configurations. A phrase, for example, a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

The invention claimed is:

1. A computer-implemented method for causing a user to look into a camera, the method comprising:
   determining a position of a camera coupled with a computing device, wherein determining the position of the camera comprises:
      presenting an indicator on a screen and prompting the user to look at the indicator, wherein the indicator is colored so as to distinguish the indicator from a background;
      moving the indicator around the screen;
      determining, based on an input from the camera while moving the indicator around the screen, that the face of the user is repositioned toward the camera; and
      determining the position of the camera based on a position of the indicator at a time when the face of the user is repositioned toward the camera; and
   displaying a computer-generated element proximate to the determined position of the camera, the computer-generated element being presented for causing a user of the computing device to reposition a face of the user toward the determined position of the camera.

2. The method of claim 1, further comprising:
   instantiating an application for transmitting video captured via the camera.

3. The method of claim 2, wherein the application comprises an online meeting application, and wherein the computer-generated element comprises a video feed or a screen sharing feed from the online meeting application.

4. The method of claim 2, wherein the application comprises an online meeting application, and wherein the computer-generated element comprises data from one or more files being shared via the online meeting application.

5. The method of claim 2, wherein the computer-generated element comprises a control for the application.

6. The method of claim 1, wherein the computer-generated element comprises a flashing light or text.

7. The method of claim 1, wherein determining the position of the camera comprises:
   determining a computing device type of the computing device;
   determining the position of the camera based on a position of a built-in camera of the computing device type.

8. The method of claim 7, determining the position of the camera based on the position of the built-in camera of the computing device type comprises:
   looking up the position of the built-in camera of the computing device type in a data repository, the data repository comprising a mapping of computing device types to positions of built-in cameras.

9. The method of claim 1, wherein determining the position of the camera comprises:
   receiving, from the user, an input indicating the position of the camera.

10. A non-transitory computer-readable medium for causing a user to look into a camera, the computer-readable medium comprising instructions which, when executed by one or more computers, cause the one or more computers to implement a method, the method comprising:

determining a position of a camera coupled with a computing device, wherein determining the position of the camera comprises:

presenting an indicator on a screen and prompting the user to look at the indicator, wherein the indicator is colored so as to distinguish the indicator from a background;

moving the indicator around the screen;

determining, based on an input from the camera while moving the indicator around the screen, that the face of the user is repositioned toward the camera; and determining the position of the camera based on a position of the indicator at a time when the face of the user is repositioned toward the camera; and displaying a computer-generated element proximate to the determined position of the camera, the computer-generated element being presented for causing a user of the computing device to reposition a face of the user toward the determined position of the camera.

11. The computer-readable medium of claim 10, the method further comprising:

instantiating an application for transmitting video captured via the camera.

12. The computer-readable medium of claim 11, wherein the application comprises an online meeting application, and wherein the computer-generated element comprises a video feed or a screen sharing feed from the online meeting application.

13. The computer-readable medium of claim 11, wherein the application comprises an online meeting application, and wherein the computer-generated element comprises data from one or more files being shared via the online meeting application.

14. The computer-readable medium of claim 11, wherein the computer-generated element comprises a control for the application.

15. The computer-readable medium of claim 10, wherein the computer-generated element comprises a flashing light or text.

16. The computer-readable medium of claim 10, wherein determining the position of the camera comprises:

determining a computing device type of the computing device;

determining the position of the camera based on a position of a built-in camera of the computing device type.

17. The computer-readable medium of claim 16, determining the position of the camera based on the position of the built-in camera of the computing device type comprises:

looking up the position of the built-in camera of the computing device type in a data repository, the data repository comprising a mapping of computing device types to positions of built-in cameras.

18. The computer-readable medium of claim 10, wherein determining the position of the camera comprises:

receiving, from the user, an input indicating the position of the camera.

19. A system for causing a user to look into a camera, the system comprising:

processing hardware; and a memory comprising instructions which, when executed by the processing hardware, cause the processing hardware to implement a method, the method comprising:

determining a position of a camera coupled with a computing device, wherein determining the position of the camera comprises:

presenting an indicator on a screen and prompting the user to look at the indicator, wherein the indicator is colored so as to distinguish the indicator from a background;

moving the indicator around the screen;

determining, based on an input from the camera while moving the indicator around the screen, that the face of the user is repositioned toward the camera; and determining the position of the camera based on a position of the indicator at a time when the face of the user is repositioned toward the camera; and displaying a computer-generated element proximate to the determined position of the camera, the computer-generated element being presented for causing a user of the computing device to reposition a face of the user toward the determined position of the camera.

20. The method of claim 1, wherein moving the indicator around the screen comprises:

if the camera is not embedded in the screen, moving the indicator around a border or an edge of the screen; and if the camera is embedded in the screen, moving the indicator around an interior of the screen and around the border and the edge of the screen.

\* \* \* \* \*